(12) United States Patent
Yuan et al.

(10) Patent No.: US 12,462,054 B2
(45) Date of Patent: Nov. 4, 2025

(54) DATA PROTECTION IMPLEMENTED BY CONTAINER LIFECYCLE HOOKS

(71) Applicant: International Business Machines Corporation, Armonk, NY (US)

(72) Inventors: Yi Yuan, Beijing (CN); Lu Lu, Beijing (CN); Xiao Hu He, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 18/330,499

(22) Filed: Jun. 7, 2023

(65) Prior Publication Data

US 2024/0411909 A1 Dec. 12, 2024

(51) Int. Cl.
| | | |
|---|---|---|
| *G06F 21/54* | (2013.01) | |
| *G06F 21/53* | (2013.01) | |
| *G06F 21/60* | (2013.01) | |
| *G06F 21/62* | (2013.01) | |
| *G06F 21/71* | (2013.01) | |
| *H04L 9/14* | (2006.01) | |

(52) U.S. Cl.
CPC ........ *G06F 21/6218* (2013.01); *G06F 21/602* (2013.01); *G06F 21/606* (2013.01)

(58) Field of Classification Search
None
See application file for complete search history.

(56) References Cited

U.S. PATENT DOCUMENTS

| | | | |
|---|---|---|---|
| 11,310,035 B2 | 4/2022 | Mistry | |
| 11,501,026 B2 | 11/2022 | Kulkarni | |
| 2008/0083036 A1 | 4/2008 | Ozzie | |
| 2016/0292431 A1* | 10/2016 | Sreekanti | G06F 21/602 |
| 2016/0352705 A1* | 12/2016 | Lockhart | H04L 63/061 |
| 2020/0336472 A1* | 10/2020 | Drummond | H04L 9/0836 |
| 2022/0012373 A1* | 1/2022 | Kulkarni | G06F 21/602 |
| 2022/0180000 A1* | 6/2022 | Sofia | G06F 21/53 |
| 2024/0193255 A1* | 6/2024 | Quinlan | H04L 9/0894 |
| 2025/0247375 A1* | 7/2025 | Hansen | H04L 47/2475 |

OTHER PUBLICATIONS

Amazon, "Using server-side encryption with customer-provided keys (SSE-C)", Amazon Web Services, Inc., 2023, 18 Pages.
Authors et al.: Disclosed Anonymously, "Protecting secrets in Docker environments", An IP.com Prior Art Database Technical Disclosure, IP.com No. IPCOM000262988D, IP.com Electronic Publication Date: Jul. 20, 2020, 6 Pages.
(Continued)

*Primary Examiner* — Venkat Perungavoor
(74) *Attorney, Agent, or Firm* — Anthony M. Pallone (57) ABSTRACT

The present disclosure provides a computer-implemented method, computer system and computer program product for data protection. According to the method, a first container may be created before an application container is ready for running. The first container is configured to: receive a first key from a key management device; obtain first encrypted data for the application container from a storage device; decrypt the first encrypted data using the first key to obtain first decrypted data; and mount the first decrypted data into the application container. The first container may be exited, and then the application container may be switched to ready for running.

18 Claims, 3 Drawing Sheets

(56) References Cited

OTHER PUBLICATIONS

Chauthaiwale, Atharva, "Kubernetes Deep Dive Part 1 : Init Containers and Lifecycle Hooks", LinkedIn, May 28, 2018, 8 Pages.
Docker, "Manage sensitive data with Docker secrets", Docker, Accessed Jan. 5, 2023, 28 Pages.
Google, "Encrypt disks with customer-supplied encryption keys", Google Cloud, Jan. 4, 2023, 18 Pages.
Kubernetes, "Using a KMS provider for data encryption", The Kubernetes Authors, Mar. 30, 2023, 8 Pages.

* cited by examiner

DATA PROTECTION IMPLEMENTED BY CONTAINER LIFECYCLE HOOKS

BACKGROUND

The present invention relates to computer technologies, and more specifically, to data protection for containers.

Nowadays, container technologies are widely applied in cloud or non-cloud environments. Data of a container may be isolated from another container. How to protect sensitive data or other important data of containers becomes a focused issue.

SUMMARY

According to one embodiment of the present invention, there is provided a computer-implemented method. According to the computer-implemented method, a first container may be created before an application container is ready for running. The first container is configured to: receive a first key from a key management device; obtain first encrypted data for the application container from a storage device; decrypt the first encrypted data using the first key to obtain first decrypted data; and mount the first decrypted data into the application container. The first container may be exited, and then the application container may be switched to ready for running.

According to another embodiment of the present invention, there is provided a computer system. The computer system comprises one or more processors, a computer-readable memory coupled to the one or more processors. The computer-readable memory comprises instructions that when executed by the one or more processors perform actions of the above-mentioned computer-implemented method.

According to another embodiment of the present invention, there is provided a computer program product. The computer program product comprises a computer readable storage medium having program instructions embodied therewith, the program instructions executable by a processor to cause the processor to perform actions of the above-mentioned computer-implemented method.

According to embodiments of the present invention, data of an application container may only be in a decrypted (or unencrypted) form in a temporary file space of the application container and may be encrypted and then stored on a storage device, thus data of the application container could be protected to avoid being exposed to an unauthorized user. Additionally, a key used to encrypt and decrypt data of the application container may not be kept in a docker image of the application container, thus avoiding the key being exposed from the docker image to an unauthorized user.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
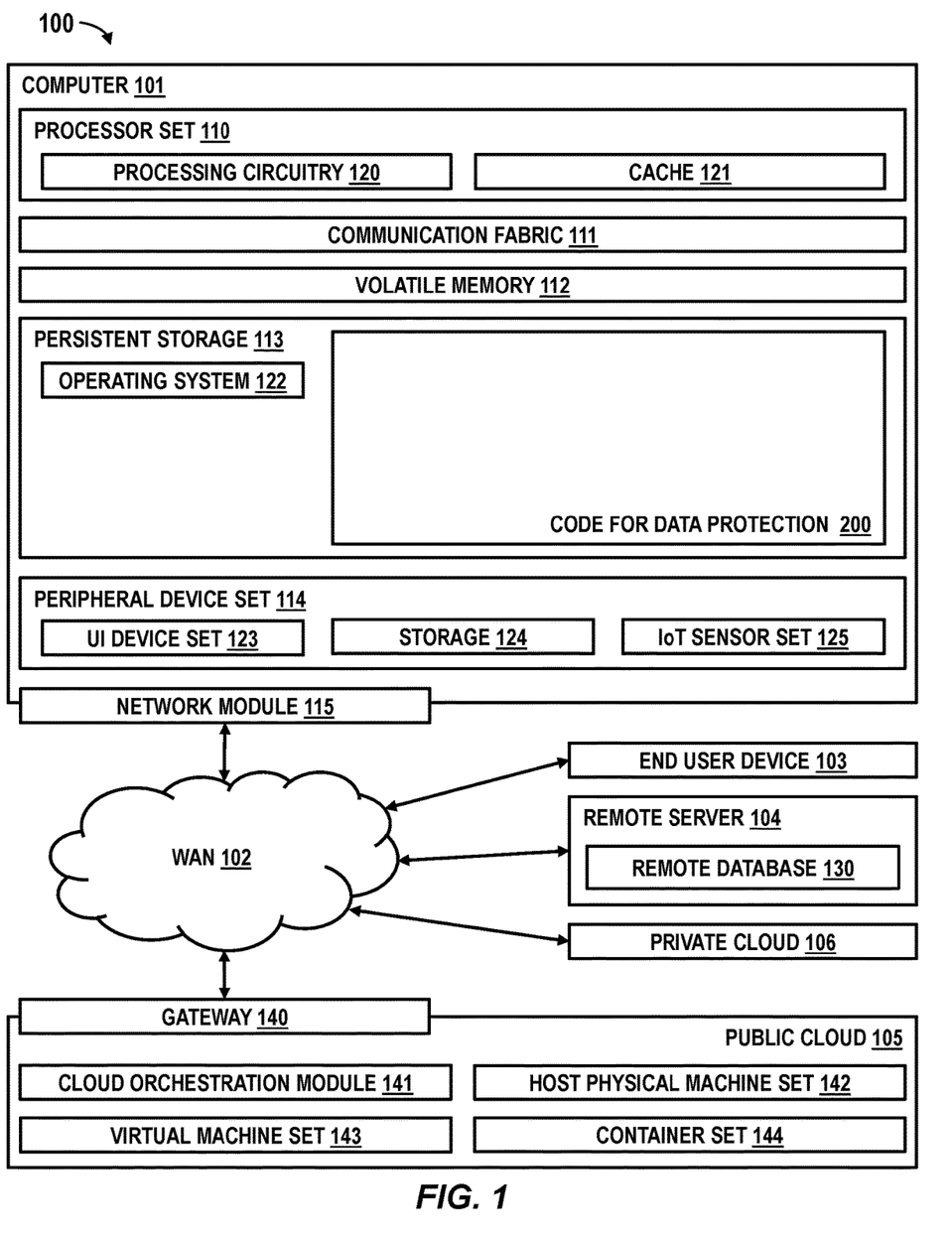
FIG. 1 shows an exemplary computing environment which is applicable to implement the embodiments of the present invention.

Referring to FIG. 1, computing environment 100 contains an example of an environment for the execution of at least some of the computer code involved in performing the inventive methods, such as code for data protection 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this invention, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

Persistence data may be loaded into a container as volume mount, and disk encryption may be applied to protect the persistence data. However, in this manner, a user having appropriate authorization of a physical or virtual device hosting the container may still be able to access the persistence data under disk encryption. In an alternative manner, the persistence data may be encrypted using a key kept inside the container during runtime of the container. However, there is still a risk of exposing the key via docker image sharing.

The present invention proposes a manner to protect data during runtime of containers.

Figure 2:
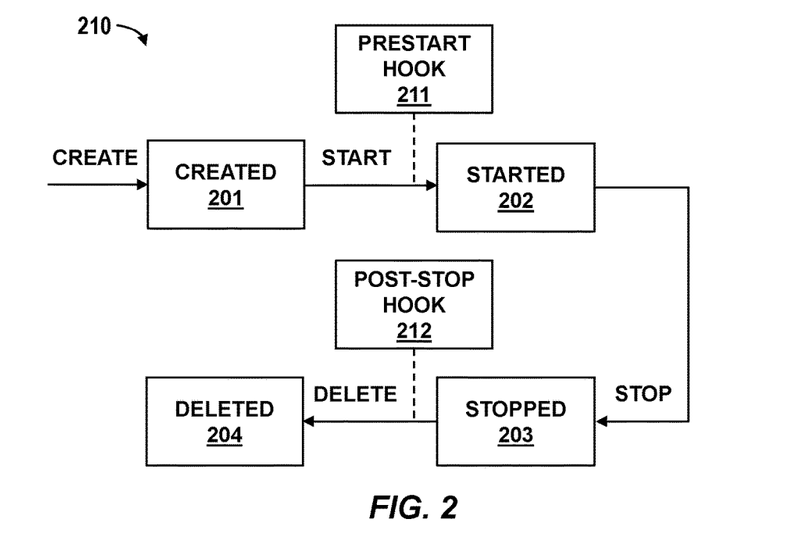
FIG. 2 shows an example lifecycle of a container according to embodiments of the present invention.

With reference now to FIG. 2, an example lifecycle 210 of a container according to an embodiment of the present invention is depicted. The lifecycle 210 of the container may include multiple statuses, such as, created status 201, started status 202, stopped status 203 and deleted status 204, etc. As an example, after a container is created by a container engine, the container may be in the created status 201. Then, if the created container is started, the container may move from the created status 201 to the started status 202, which mean the container is ready for running. When the container is running, data of services or applications may be processed in the container. If running of the container is stopped, the container may move to the stopped status 203. At last, if the container is deleted by the container engine, the container may be in the deleted status 204. It shall be noted that the lifecycle 210 may also include one or more statuses other than those depicted in FIG. 2.

In some embodiments, multiple hooks, such as a prestart hook 211, and a post-stop hook 212, may be implemented for the container during the lifecycle 210 of the container. For example, the prestart hook 211 may be implemented before the container moves from the created status 201 to the started status 202. The post-stop hook 212 may be implemented before the container moves from the stopped status 203 to the deleted status 204. It shall be noted that one or more other hooks other than those depicted in FIG. 2 may also be implemented during the lifecycle 210 of the container.

According to embodiments of the present invention, in the prestart hook 211, previously encrypted data may be decrypted, and then the obtained decrypted data may be mounted into the container runtime. In the post-stop hook 212, data of the container may be encrypted and then the obtained encrypted data may be stored for usage by corresponding containers to be started subsequently.

Figure 3:
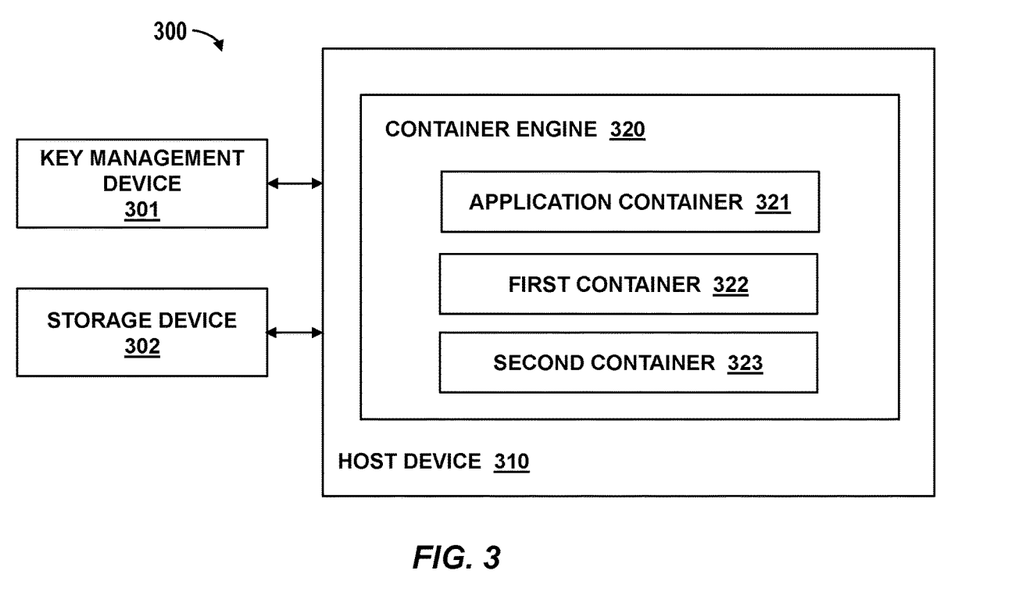
FIG. 3 shows an example system for data protection according to embodiments of the present invention.

With reference now to FIG. 3, an example system 300 for data protection according to embodiments of the present invention is depicted. A container engine 320 is implemented on a host device 310. The container engine 320 may be capable to manage containers created and run on the host device 310. As an example, the container engine 320 may create an application container 321 to process first data of services and/or applications (may also be referred to as the first data for the application container 321 hereinafter). In this example, the first data to be processed or kept in the application container 321 may need to be protected. For example, the first data under protection may be in an encrypted form, and the first data in the encrypted form may also be referred to as first encrypted data for the application container 321. It shall be noted that the host device 310 could be any type of physical or virtual device now known or to be developed, such as the computer 101, the end user device 103, the remote server 104, the public cloud 105, and/or the private cloud 106 of FIG. 1, etc.

According to embodiments of the present invention, in order to access the first encrypted data, before the application container 321 is ready for running, the container engine 320 may create a first container 322. The first container 322 may be isolated from the application container 321. In some embodiments, the situation "before the application container 321 is ready for running" may comprise one or more of the following situations, such as, before the application container 321 moves from the created status to the started status; before required data is mounted to the application container 321, etc. The required data may comprise data necessary for running of the application container 321, data required to be processed in the application container 321, etc. In some embodiments, the creation of the first container 322 may be implemented during the period of the prestart hook 211 of FIG. 2.

According to embodiments of the present invention, the first container 322 may be configured to obtain a first key from a key management device 301. As an example, the obtained first key may be a key which is generated according to a cryptography algorithm now known or to be developed and capable to decrypt the first encrypted data. The cryptography algorithm may be a symmetric cryptography algorithm, or an asymmetric cryptography algorithm, etc. In an example of symmetric cryptography, the first key may be the same with a key with which the first encrypted data is obtained during a previous encryption process. In an example of asymmetric cryptography, the first key may be a private key corresponding to a public key with which the first encrypted data is obtained during the previous encryption process. The key management device 301 may be a physical or virtual device operated by a trusted authority and capable to generate or obtain the first key. In some embodiments, the key management device 301 may be capable to store the first key obtained from another device which may generate keys. The first key may map with the first encrypted data stored on a storage device. The mapping relationship between keys and encrypted data may also be stored on the key management device 301, the storage device 302, or on another storage device accessible by the first container 322.

Taking table 1 as an example, table 1 may be applied to store the mapping relationship between respective keys and corresponding encrypted data. The keys and encrypted data may be identified as uniform resource identifiers (URIs). As an example, the key management device 301 may be capable to get the URI of encrypted data (such as, URI_D1) corresponding to the application container 321. In some embodiments of the present invention, the key management device 301 may return a URI of the first key (such as, URI_K1) to the first container 322 based an entry of the table 1. Then the first container 322 may obtain the first key based on the URI of the first key. In some embodiments of the present invention, the key management device 301 may directly return the first key retrieved based the entry of the table 1 to the first container 322.

TABLE 1

Mapping Between Key and Encrypted Data

| KEY | ENCRYPTED DATA |
|---|---|
| URI_K1 | URI_D1 |
| URI_K2 | URI_D2 |
| URI_K2_PRI | URI_D2 |
| ... | ... |

According to embodiments of the present invention, the first container 322 may be further configured to obtain the first encrypted data for the application container 321 from the storage device 302.

In some embodiments, the first encrypted data for the application container 321 may also be referred to as encrypted data designated for the application container 321, or encrypted data for (or designated for) the first container 322, etc. In some embodiments, since the first container 322 is implemented, the first container 322 may be configured to obtain URIs of the first encrypted data for the application container 321. Then, the first container 322 may obtain the first encrypted data from the storage device 302 based on the URIs of the first encrypted data.

In some embodiments, the obtained first encrypted data for the application container 321 may comprise encrypted data stored previously on the storage device 302 from a previous application container corresponding to the application container 321. For example, before a previous application container is deleted, the data kept in the previous application container may be encrypted using a key, which is the same with the first key (in examples of symmetric cryptography) or a public key corresponding to the first key (in examples of asymmetric cryptography), and stored on the storage device 302. Then, the encrypted data from the previous application container may be designated for the application container 321. The process to encrypt data of the previous application container may be similar to the process implemented by the second container 323 described below with reference to FIG. 5.

In some embodiments, the obtained first encrypted data for the application container 321 may comprise encrypted data generated, by the storage device 302 or another user device, by encrypting original data using an encryption key corresponding to the first key. In some examples, the encryption key is the same with the first key. In some other examples, the first key may be a private key, and the encryption key may be a public key corresponding to the first key. The original data may be unencrypted data collected by the storage device 302. In an example, the application container 321 may be designated with the original data only and without encrypted data from a previous application container. In another example, the storage device 302 may be a user device which is capable to process and store user data. The user data stored on the storage device 302 (also may be referred to as the original data) may be encrypted using the encryption key to obtain the encrypted data, which is then sent to the first container 322.

In some embodiments, the application container 321 may be designated with both the original data and encrypted data from a previous application container. The first encrypted data for the application container 321 may comprise two types of encrypted data: (1) encrypted data stored previously on the storage device 302 from a previous application container corresponding to the application container 321, and (2) the encrypted data stored on the storage device 302 which is generated by encrypting original data using an encryption key corresponding to the first key.

According to embodiments of the present invention, the first container 322 may be further configured to decrypt the obtained first encrypted data using the first key to obtain first decrypted data. It shall be noted that many now known or to be developed encryption and decryption methods may be applied in embodiments of the present invention.

According to embodiments of the present invention, the first container 322 may be further configured to mount the first decrypted data to the application container 321. After the mounting, the first decrypted data may be accessed and process in the application container 321. In some embodiments, the first decrypted data may be stored in a temporary file space directing into a volume or file system which is accessible by the application container 321.

According to embodiments of the present invention, the container engine 320 may exit the first container 322 and switch the application container 321 to ready for running.

Herein, "ready for running" may be a status of the application container 321 which represents the application container 321 is ready for running. In some embodiments, switch the application container 321 to ready for running may comprise one or more of the following actions: switch the status of the application container 321 from the created status 201 to the started status 202 of FIG. 2; add the application container 321 into a list of active containers; and/or identify the application container 321 as capable to run and/or process the mounted data, etc. In some embodiments, exiting the first container 322 may represent resources of the first container 322 are released.

In some embodiments, the first key is accessible only in the first container 322, and the first key may be removed by the first container 322 after the decryption. In this way, the risk of exposing the first key may be further reduced.

During the running of the first container 322, the application container 321 may accumulate second data of services/applications that need to be stored. According to embodiments of the present invention, in response to a request for storing the second data of the application container 321 on a storage device outside the application container 321, the container engine 320 may create a second container 323. The second container 323 may be isolated from the application container 321. The request for storing the second data of the application container may be generated in response to at least one of the following events: the application container 321 is to be deleted, the second data of the application container 321 is to be removed from the temporary file space of the application container, and/or a command for storing the second data is received from a user of the application container 321, etc.

For example, before the application container 321 is deleted by the container engine 320, an event "the application container 321 is to be deleted" may be detected, and then a request for storing the second data of application container 321 may be generated. As a further example, before the second data of the application container 321 is removed from a temporary file space of the application container 321, an event "the data of the application container 321 is to be removed" may be detected, and then a request for storing the data may be generated. The request for storing the data may also be generated in response to receiving a command for storing the second data from a user of the application container 321. The request for storing the data may also be generated as needed, or periodically, etc. In some embodiments, the situation "before the application container 321 is deleted" may comprise, such as, before the application container 321 moves from the stopped status 203 to the deleted status 204 of FIG. 2, etc. In some embodiments, the creation of the second container 322 may be implemented during the period of the post-stop hook 212 of FIG. 2.

According to embodiments of the present invention, the second container 323 may be configured to obtain a second key. In some embodiments, the second container 323 may obtain the second key from a key management device, such as, the key management device 301. It shall be understood, in some embodiments, the second container 323 may receive the second key from another key management device other than the key management device 301. In some embodiments of symmetric cryptography, the second key may be the same with the first key, and the previous received first key may be applied as the second key. In some other embodiments, the second key may be different from the first key.

According to embodiments of the present invention, the second container 323 may be further configured to retrieve the second data of the application container 321, which is to be stored under protection, from a temporary file space of the application container 321.

According to embodiments of the present invention, the second container 323 may be further configured to encrypt the second data using the second key to obtained second encrypted data and store the second encrypted data on a storage device outside the application container 321. The storage device may be the storage device 302 or another device that is capable to store encrypted data.

According to embodiments of the present invention, the container engine 320 may exit the second container 323. In some embodiments, exiting the second container 323 may represent resources of the second container 323 are released. In some embodiments, the container engine 320 may further switch the application container 321 to the deleted status 204. In some embodiments, switch the application container 321 to the deleted status 204 of FIG. 2 may comprise one or more of the following actions: switch the status of the application container 321 from the stopped status 203 to the deleted status 204, and/or remove the application container 321 from a list of active containers, etc.

In some embodiments, a mapping relationship between the second key and the second encrypted data is stored on the key management device 301, the storage device 302, or another device. The stored mapping relationship between the second key and the second encrypted data may be used for future query and retrieval for keys and encrypted data.

In some embodiments, the second encrypted data may be designated for a future application container (such as, a future application container corresponding to the application container 321) to be started subsequently, and the second key (or a private key corresponding to the second key) may be retrieved later, by a decryption container, based on the stored mapping relationship between the second key and the second encrypted data. The decryption container may be created later for the future application container and may act similarly to the first container 322. Then, the decryption container may be capable to decrypt the second encrypted data using the retrieved second key (or the retrieved private key corresponding to the second key). The process of decrypting the second encrypted data implemented by the future application container may be similar to the process implemented by the first container 322 described hereinbefore or the process described below with reference to FIG. 4 hereinafter.

In some embodiments of symmetric cryptography, an URI of the second key (such as, URI_K2) and an URI of the second encrypted data (such as, URI_D2) may be generated and the mapping between URI_K2 and URI_D2 may be stored as an entry in Table 1. The second key may be retrieved back later based on the stored mapping relationship entry "URI_K2, URI_D2".

In some embodiments of asymmetric cryptography, the second key may be a public key, a private key corresponding to the second key may be retrieved later, based on the stored mapping relationship, by the decryption container. As an example, an URI of the second key (such as, URI_K2) and an URI of the second encrypted data (such as, URI_D2) may be generated and the mapping between URI_K2 and URI_D2 may be stored as an entry in Table 1. The private key corresponding to the second key may be retrieved later based on the entry "URI_K2, URI_D2". In some embodiments, the mapping relationship between the second key and the second encrypted data may also include the mapping relationship between the private key corresponding to the second key and the second encrypted data. For example, an URI of the private key corresponding to the second key (such as, URI_K2_PRI) and an URI of the second encrypted data (such as, URI_D2) may be generated and the mapping between URI_K2_PRI and URI_D2 may also be stored as an entry in Table 1. The private key corresponding to the second key may be retrieved later based on the entry "URI_K2_PRI, URI_D2".

According to embodiments of the present invention, data in the application container 321 may only be in a decrypted (or unencrypted) form in a temporary file space of the application container 321 and may be in an encrypted form outside the application container 321, thus data in the application container 321 could be protected to avoid being exposed to an unauthorized user for the application container 321. Additionally, the key used to encrypt and decrypt data of the application container 321 may not be kept in a docker image of the application container 321, thus avoiding the key being exposed from the docker image to an unauthorized user.

Figure 4:
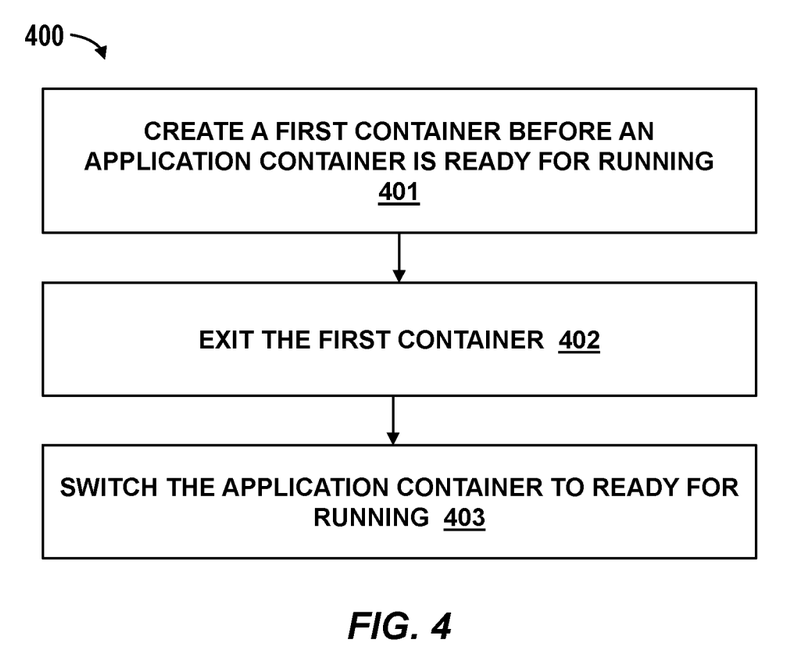
FIG. 4 shows a schematic flowchart of a method for data protection according to embodiments of the present invention.

Referring now to FIG. 4, a schematic flowchart of a method 400 for data protection according to embodiments of the present invention is depicted. The method 400 may be implemented by the code for data protection 200 of FIG. 1, as well as the host device 310 and the container engine 320 of the FIG. 3, and/or any physical or virtual device capable to manage containers in a network environment, etc. It should be noted that the method 400 is only illustrative and is not intended to suggest any limitation to the scope the present disclosure.

At block 401, a computer device implementing the method 400 may create a first container before the application container is ready for running. The first container may be configured to: receive a first key from a key management device; obtain first encrypted data for the first container from a storage device; decrypt the first encrypted data using the first key to obtain first decrypted data; and mount the first decrypted data into the application container.

At block 402, the computer device implementing the method 400 may exit the first container. Then at block 403, the computer device implementing the method 400 may switch the application container to ready for running.

In some embodiments, the first encrypted data may comprise encrypted data stored previously on the storage device which is received from another container isolated from the application container. In some embodiments, the first encrypted data may further comprise encrypted data stored on the storage device which is generated by encrypting original data using an encryption key corresponding to the first key.

In some embodiments, the first key is received from the key management device based on a mapping relationship between the first key and the first encrypted data stored previously on a storage device.

In some embodiments, the first decrypted data may be stored in a temporary file space directing into a volume or file system accessible by the application container.

In some embodiments, the first key may be accessible only in the first container, and the first key may be removed by the first container after the decryption.

In some embodiments, before the application container is ready for running may comprise at least one selected from the following group: before the application container moves from created status to started status, and before data is mounted to the application container, etc. In some embodiments, switch the application container as ready for running may comprise one or more of the following actions: switch the status of the application container from created status to started status, add the application container into a list of active containers, and identify the application container 321 as capable to run and/or process the mounted data, etc.

Figure 5:
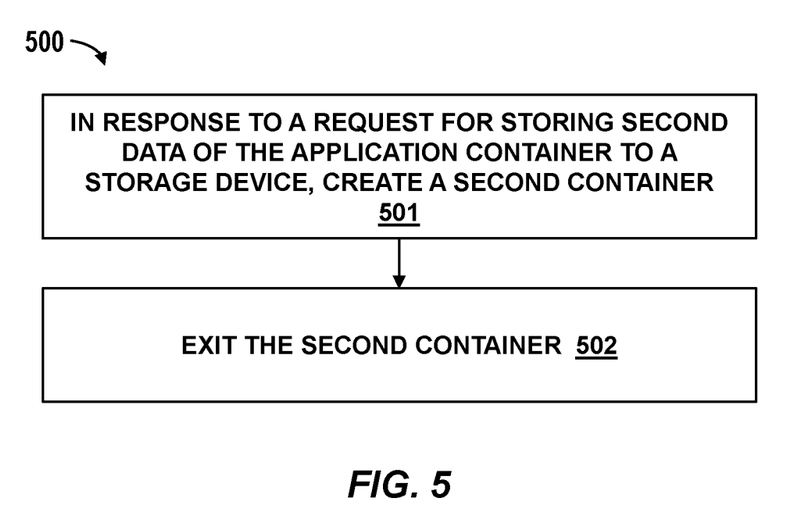
FIG. 5 shows another schematic flowchart of a method for data protection according to embodiments of the present invention.

Referring now to FIG. 5, a schematic flowchart of a method 500 for data protection according to embodiments of the present invention is depicted. The method 500 may be implemented by the code for data protection 200 of FIG. 1, as well as the host device 310 and the container engine 320 of the FIG. 3, and/or any physical or virtual device capable to manage containers in a network environment, etc. It should be noted that the method 500 is only illustrative and is not intended to suggest any limitation to the scope the present disclosure.

At block 501, a computer device implementing the method 500 may create a second container in response to a request for storing second data of the application container on a storage device outside the application container. The second container may be isolated from the application container. The second container may be configured to: obtain a second key; retrieve the second data of the application container from a temporary file space of the application container; encrypt the second data using the second key to obtained second encrypted data; and store the second encrypted data on the storage device outside the application container.

At block 502, a computer device implementing the method 500 may exit the second container.

In some embodiments, a mapping relationship between the second key and the second encrypted data may be stored on a storage device.

In some embodiments, the second encrypted data may be designated for a future application container to be started subsequently, and the second key or a private key corresponding to the second key may be retrieved, based on the stored mapping relationship between the second key and the second encrypted data, by a decryption container created subsequently for the future application container.

In some embodiments, the request for storing the second data of the application container may be generated in response to at least one of the following events: the application container is to be deleted, the second data of the application container is to be removed from the temporary file space of the application container, and a command for storing the second data is received from a user of the application container, etc.

It should be noted that the processing of data protection according to embodiments of the present disclosure could be implemented in the computing environment of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
creating, by one or more processors, a first container before an application container is ready for running, wherein the first container is configured to receive a first key from a key management device, obtain first encrypted data for the application container from a storage device, decrypt the first encrypted data using the first key to obtain first decrypted data, and mount the first decrypted data into the application container, wherein the first decrypted data is present and stored only within a temporary file space of the application container, and wherein the first key is accessible only in the first container, and wherein the first key is removed from the first container after the decryption of the first encrypted data;
exiting, by one or more processors, the first container; and
switching, by one or more processors, the application container to ready for running.

2. The computer-implemented method of claim 1, wherein the first encrypted data comprises encrypted data stored previously on the storage device which is received from another container isolated from the application container, and/or encrypted data stored on the storage device which is generated by encrypting original data using an encryption key corresponding to the first key.

3. The computer-implemented method of claim 1, wherein the first key is received based on a mapping relationship between the first key and the first encrypted data stored previously on the storage device.

4. The computer-implemented method of claim 1, wherein before the application container is ready for running comprises at least one selected from the group consisting of before the application container moves from created status to started status, and before required data is mounted into the application container.

5. The computer-implemented method of claim 1, further comprising:
in response to a request for storing second data of the application container to a storage device outside the application container, creating, by one or more processors, a second container, wherein the second container is configured to obtain a second key, retrieve the second data of the application container from the temporary file space of the application container, encrypt the second data using the second key to obtain second encrypted data, and store the second encrypted data on the storage device outside the application container; and
exiting, by one or more processors, the second container.

6. The computer-implemented method of claim 5, wherein a mapping relationship between the second key and the second encrypted data is stored on the storage device.

7. The computer-implemented method of claim 6, wherein the second encrypted data is designated for a future application container to be started subsequently, the second key or a private key corresponding to the second key is retrieved based on the stored the mapping relationship between the second key and the second encrypted data by a decryption container created subsequently for the future application container.

8. The computer-implemented method of claim 5, wherein the request for storing the second data of the application container is generated in response to at least one event selected from the group consisting of the application container is to be deleted, the second data of the application container is to be removed from the temporary file space of the application container, and a command for storing the second data is received from a user of the application container.

9. A computer system, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
creating a first container before an application container is ready for running, wherein the first container is configured to receive a first key from a key management device, obtain first encrypted data for the application container from a storage device, decrypt the first encrypted data using the first key to obtain first decrypted data, and mount the first decrypted data into the application container, wherein the first decrypted data is present and stored only within a temporary file space of the application container, and wherein the first key is accessible only in the first container, and wherein the first key is removed from the first container after the decryption of the first encrypted data;
exiting the first container; and
switching the application container to ready for running.

10. The computer system of claim 9, wherein the first encrypted data comprises encrypted data stored previously on the storage device which is received from another container isolated from the application container, and/or encrypted data stored on the storage device which is generated by encrypting original data using an encryption key corresponding to the first key.

11. The computer system of claim 9, wherein the first key is received based on a mapping relationship between the first key and the first encrypted data stored previously on the storage device.

12. The computer system of claim 9, wherein before the application container is ready for running comprises at least one selected from the group consisting of before the application container moves from created status to started status, and before required data is mounted into the application container.

13. The computer system of claim 9, the method further comprising:
in response to a request for storing second data of the application container to a storage device outside the application container, creating a second container, wherein the second container is configured to obtain a second key, retrieve the second data of the application container from the temporary file space of the application container, encrypt the second data using the second key to obtain second encrypted data, and store the second encrypted data on the storage device outside the application container; and
exiting the second container.

14. The computer system of claim 13, wherein a mapping relationship between the second key and the second encrypted data is stored on the storage device.

15. The computer system of claim 14, wherein the second encrypted data is designated for a future application container to be started subsequently, the second key or a private key corresponding to the second key is retrieved based on the stored mapping relationship between the second key and the second encrypted data by a decryption container created subsequently for the future application container.

16. The computer system of claim 13, wherein the request for storing the second data of the application container is generated in response to at least one event selected from the group consisting of the application container is to be deleted, the second data of the application container is to be removed from the temporary file space of the application container, and a command for storing the second data is received from a user of the application container.

17. A computer program product, the computer program product comprising:
one or more computer-readable tangible storage medium and program instructions stored on at least one of the one or more tangible storage medium, the program instructions executable by a processor capable of performing a method, the method comprising:
creating a first container before an application container is ready for running, wherein the first container is configured to receive a first key from a key management device, obtain first encrypted data for the application container from a storage device, decrypt the first encrypted data using the first key to obtain first decrypted data, and mount the first decrypted data into the application container, wherein the first decrypted data is present and stored only within a temporary file space of the application container, and wherein the first key is accessible only in the first container, and wherein the first key is removed from the first container after the decryption of the first encrypted data;
exiting the first container; and
switching the application container to ready for running.

18. The computer program product of claim 17, the method further comprising:
in response to a request for storing second data of the application container to a storage device outside the application container, creating a second container, wherein the second container is configured to obtain a second key, retrieve the second data of the application container from the temporary file space of the application container, encrypt the second data using the second key to obtain second encrypted data, and store the second encrypted data on the storage device outside the application container; and
exiting the second container.

* * * * *